Oct. 4, 1966 H. C. DUGAN ETAL 3,276,935

METHOD OF MANUFACTURING AN IMPROVED THERMAL BLANKET

Filed Oct. 11, 1961 3 Sheets-Sheet 1

INVENTORS
HUGH C DUGAN
BY RICHARD J. GUGLIELMO

John J. McGlew
ATTORNEY

Oct. 4, 1966            H. C. DUGAN ETAL            3,276,935

METHOD OF MANUFACTURING AN IMPROVED THERMAL BLANKET

Filed Oct. 11, 1961            3 Sheets-Sheet 2

INVENTORS.
HUGH C. DUGAN
BY RICHARD J. GUGLIELMO

John J. McGlew
ATTORNEY

Oct. 4, 1966    H. C. DUGAN ETAL    3,276,935
METHOD OF MANUFACTURING AN IMPROVED THERMAL BLANKET
Filed Oct. 11, 1961    3 Sheets-Sheet 3
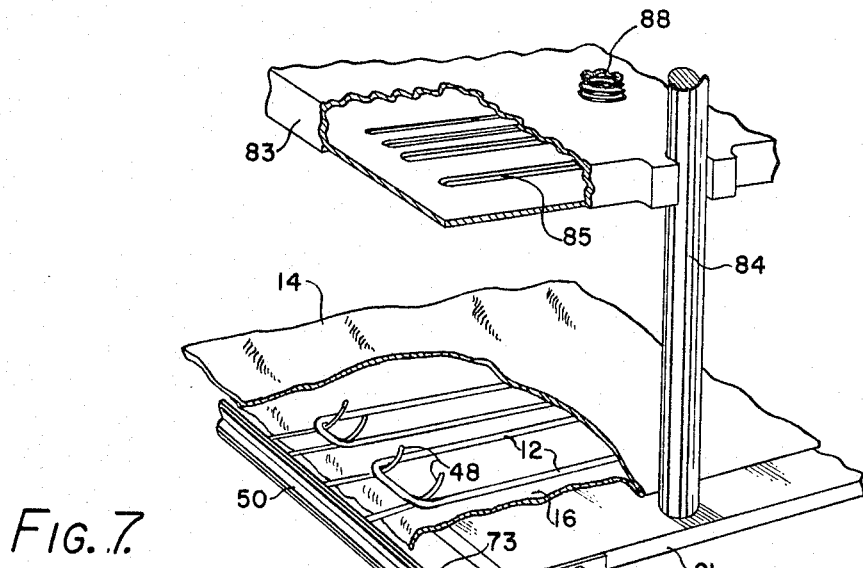
FIG. 7.
FIG. 8.
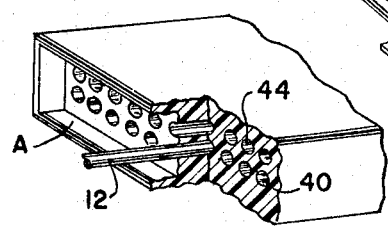
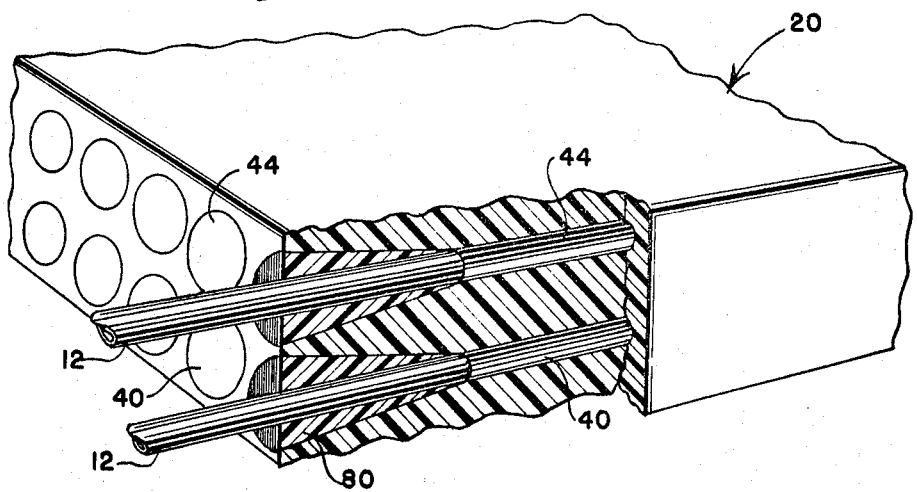
FIG. 6.
INVENTORS.
HUGH C. DUGAN
BY RICHARD J. GUGLIELMO
John J. McGlew
ATTORNEY United States Patent Office 3,276,935
Patented Oct. 4, 1966

3,276,935
METHOD OF MANUFACTURING AN IMPROVED THERMAL BLANKET
Hugh C. Dugan, Nutley, and Richard J. Guglielmo, Cresskill, N.J., assignors, by mesne assignments, to Calmac Corporation, Boston, Mass., a corporation of Massachusetts
Original application Apr. 19, 1957, Ser. No. 653,872. Divided and this application Oct. 11, 1961, Ser. No. 152,112
9 Claims. (Cl. 156—308)

This application is a division of application Serial No. 653,872, filed Apr. 19, 1957, now abandoned.

This invention relates in general to thermal blankets, or blankets having conducting elements, provided to either heat or cool the blanket and arranged in a grid pattern between layers thereof, and particularly to an improved thermal blanket construction and a method of fabricating a thermal blanket.

A thermal blanket as referred to herein includes two layers of a fabric material having a grid of conducting elements arranged between the layers in a substantially fixed pattern to provide means for either heating or cooling the entire blanket area uniformly. While the invention is described herein with particular reference to a lightweight fabric blanket of nylon, cotton, wool or similar material, primarily adapted for personal heating or cooling, the concept extends to heavier materials such as canvas or the like to be used generally as heated or cooled coverings. The term "conducting elements" is intended to include both conduits for a heat transfer liquid and insulated electrical conductors.

There are advantages in the use of fluid conducting heat transfer elements, both in assuring greatly increased safety and better and more uniform temperature control. The specific embodiments of the present invention described herein are shown as including plastic tubing of small diameter for conducting a heating or cooling liquid through a blanket grid to maintain a comfortable body temperature for the user.

Prior to the present invention thermal blankets having conducting elements therein were manufactured either by weaving the blankets in a manner forming a series of parallel passages between the layers, or by sewing together fabric layers in a manner forming a series of parallel passages. It was then necessary to thread each conducting element through the passages so formed. Finally, the conducting element grid was completed by interconnecting the various individual elements. These prior methods required considerable time and labor as well as expensive equipment in their execution.

The present invention is an improvement over the prior art particularly in respect to the blanket construction and to the method of assembling the conducting elements in the blanket and fixing them in position between the fabric layers of the blanket. In accordance with one aspect of the invention, the conducting elements are assembled into the desired grid shape and dipped in a solution to render their surface sticky or adhesive, and thereafter laid in position between the fabric layers for instant permanent positioning therein by slightly pressing the layers to the tubes, whereby the fabric fibers become embedded in the surface of the conducting elements. In accordance with another aspect of the invention the conducting elements are made of a substance which will become sticky or adhesive when activated by a solvent. The grid is assembled and laid on one of the fabric layers and covered with the other layer. Activating solvent is then directed, as by blowing, through the blanket material to cause the conducting elements to become sticky and adhere to the blanket material.

An object of this invention is to provide an improved thermal blanket construction.

A further object is to provide an improved method of assembling conducting elements between layers of fabric material.

A further object is to provide an improved method of assembling the conducting element grid. A further object is to provide an improved method for selectively bonding conducting elements to fabric materials.

A further object is to provide a simple and economical process for the manufacture of thermal blankets.

A still further object is to provide a thermal blanket which is simple in design, very flexible but rugged in construction, and economical to manufacture.

In this specification and in the accompanying drawings, there are described and shown various embodiments of the methods and apparatus of the invention and various modifications thereof are indicated, but it is to be understood that these are not intended to be exhaustive nor limiting of the invention, but on the contrary, are given for purposes of illustration in order that others skilled in the art may fully understand the invention and the manner of applying the method and apparatus for manufacturing thermal blankets, and so that they may modify and adapt the invention in various forms, each as may be best suited to the conditions of a particular use.

The various advantages and objects of the present invention will be more fully understood from a consideration of the following specification in conjunction with the accompanying drawings, in which:

FIGURE 6 is a perspective view on an enlarged scale of another embodiment of conducting element tube header;

FIGURE 7 is a perspective view on an enlarged scale of still another embodiment of conducting element tube header; and FIGURE 8 is a perspective view of a method of applying activating solvent to selective portions of the conducting elements through the blanket fabric.

Figure 1:
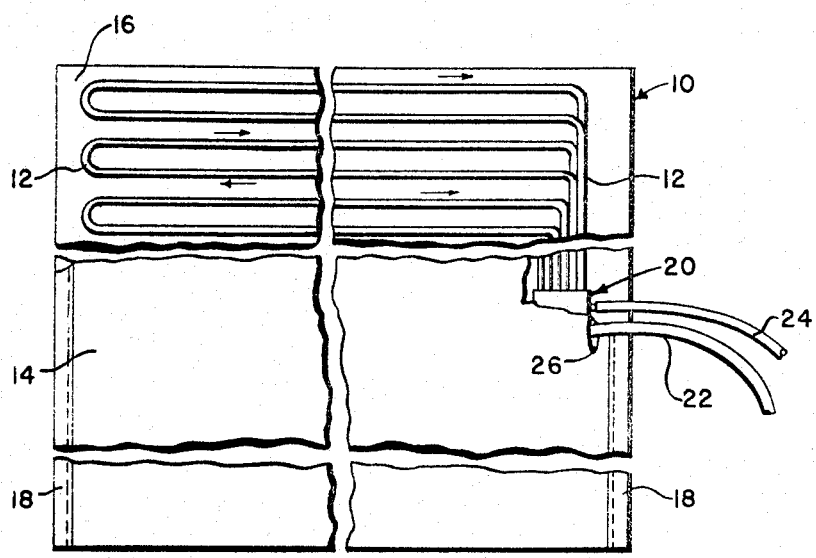
FIGURE 1 is a top plan view of a thermal blanket constructed in accordance with this invention with the top portion broken away to shown more clearly the conducting element arrangement between the fabric layers of the blanket.
Figure 2:
FIGURE 2 is a vertical cross-section on an enlarged scale of a preferred construction of one of the conducting elements indicated in FIGURE 1.

Referring to the drawings in particular, the invention as embodied therein (see FIGURE 1) includes a thermal blanket generally indicated at 10 having a plurality of conducting elements 12 positively positioned in definite locations between a top fabric layer 14 and a bottom fabric layer 16. The conducting elements 12 may, of course, be electrical heating elements, but in this case they are advantageously small flexible conduits tthrough which a hearing or cooling liquid may be circulated. The blanket 10 is preferably formed from a tube of fibrous material and each open end is sewn closed with suitable blanket edging material 18.

Figure 3:
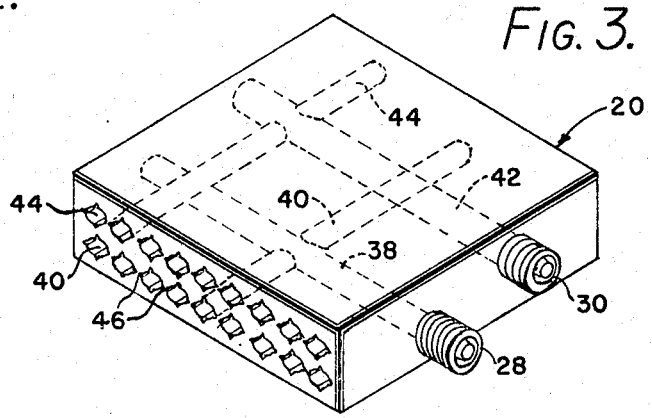
FIGURE 3 is a perspective view on enlarged scale of the conducting element tube header.

When hollow tubular conduit conducting elements are used, a suitable small size plastic header block 20 is provided to distribute either heating liquid or cooling liquid through the elements 12. In those instances wherein an electrical conducting element is used, a junction box similar to the header 20 may be used. An inlet tube 22 and an outlet tube 24 are connected through a slit 26 in the blanket fabric, to an inlet connection 28 and an outlet connection 30 (see FIGURE 3), formed integrally in the block 20. It is to be appreciated that the elements 12 and the header 20 are of very small size and do not make a prominent bulge in the assembled blanket.

In accordance with the invention, the conducting elements 12 are formed of a material such as a plastic which can be either heat-sealed to the fibrous blanket material, or activated by a solvent to become soft and tacky and then sealed or adhered to the fibrous materials of the blanket, with the fibrous elements of the blanket material embedded in the conducting element surfaces. Many plastic materials have been discovered which may be either heat sealed, solvent activated and sealed, or adhesively sealed to the fibrous materials of the blanket. Such materials include among others; polyvinyl chloride, polyvinyl chloride acetate copolymer, vinylidene chloride-vinyl chloride, polyethylene, many rubber type resins, and various cellulosics. Polyvinyl chloride acetate copolymer for example, can be "activated"; that is, made soft and sticky for easy bonding, by such solvents as ketones, esters, and similar materials.

It is also desirable to take advantage of certain characteristics, such as good flexibility and good tensile strength, of some of these plastics which are not necessarily solvent activatable, and coat them with other plastic materials which may be activated by a solvent to adhere the coated product to the fibrous materials of the blanket. For example, a plastic material 32 having good strength and flexibility, such as modified polyethylene, may be used as a core 32 for the conduits 12 and coated as indicated at 34 with one or a compound of such materials as: acrylate and methylacrylate resins, ethylcellulose, chlorinated rubber, isobutylene resins, polyamide and a great number of the synthetic rubbers, or compounds of one or more of these, to make them susceptible to solvent activation for sealing to a fabric layer.

A preferred core comprises a modified polyethylene (i.e. a flexible form of polyethylene) and a preferred coating comprises a synthetic rubber such as butadiene acrylonitrile. Butadiene acrylonitrile may be actviated by hydrocarbons, esters, ketones, and similar materials. The activating solvent is applied in a quantity which will soften the outer coating while leaving the core intact.

In some instances it is desirable to coat the inside of the tube as at 36 with a material which has good moisture vapor barrier characteristics in order to prevent an excessive loss of liquid through the conducting element walls. Where hydroscopic cooling and heating liquids or liquid mixtures are circulated through the tubing (e.g., glycerine and water), such moisture vapor barrier coatings will not be as necessary because there will be very little moisture loss through the conducting element walls even without a coating applied thereto.

The header 20 is a small solvent activatible plastic rectangular block including a transverse inlet header 38 extending from a face of the block in communication with the inlet 28 to a position spaced slightly from the opposite face. A plurality of inlet conduits 40 extend laterally entirely through the lower portion of the block, perpendicular to the header 38 and in communication therewith. An outlet header 42 extends through the upper portion of the block and extends from a face thereof in communication with the outlet 30 to a position spaced slightly from the opposite face thereof. A plurality of outlet conduits 44 extend entirely through the block perpendicular to the outlet header 42 and in communication therewith. In accordance with one embodiment of the invention, the blocks are provided with a plurality of grooves 46 at the peripheries of the outlet and inlet conduits 40 and 42, respectively, and extending from each face inwardly for a substantial distance. The grooves 46 are provided to facilitate conducting element assembly to the header 20 in a manner to be described more fully hereinafter.

In accordance with the invention, the blanket 10 may be assembled by first dipping the ends of the solvent activatible conducting elements 12 into a solvent solution which will make the areas contacted soft and sticky. For this purpose, the conducting elements 12 preferably are made to a slightly larger outside diameter than the inner diameter of the inlet and outlet conduits 40 and 44, so that the ends of the elements 12 may be pushed into a respective inlet or outlet conduit in their sticky condition to cause portions of the conduit material to flow into the grooves 46 and also bulge at the outside face of the block in order to form a complete liquid tight seal with the block. The opposite ends of each conducting loop 12 are inserted into a respective inlet and outlet conduit in this manner.

Figure 4:
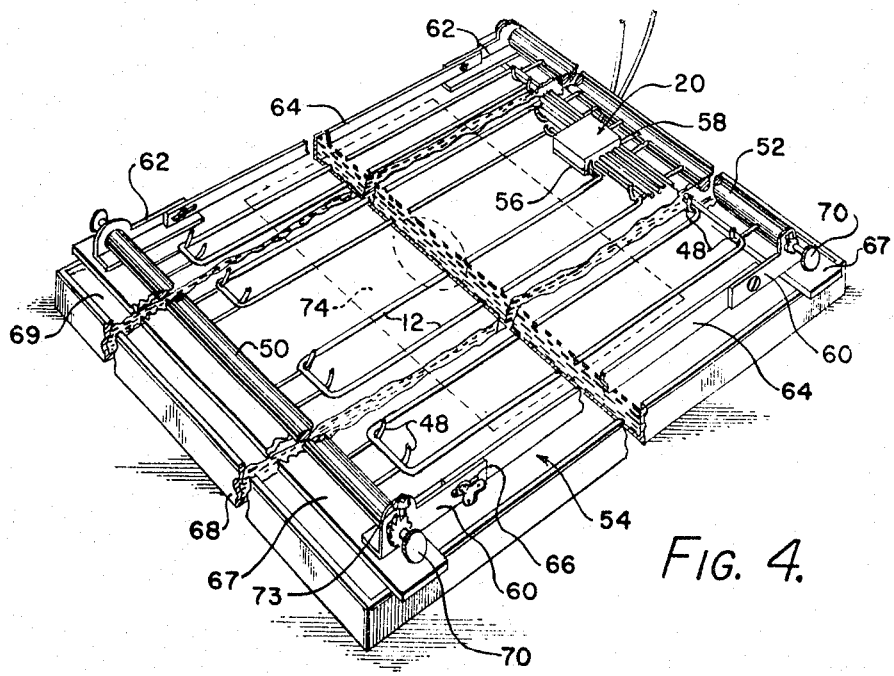
FIGURE 4 is a perspective view of a solvent dipping tank showing the conducting elements arranged in a jig above the tank prior to their immersion therein.

After all of the elements 12 have been assembled in the header 20 and the activated ends of these elements have set firmly in the header, the assembly is placed in a desired grid pattern upon curved hooks 48 which project inwardly from spaced pairs of rollers 50 and 52 of a jig generally designated 54 (see FIGURE 4). The jig 54 includes a small movable platform 56, provided to support the header 20 and mounted on a curved bracket 58. The hooks 48 are of such a number and so spaced that they hold the complete grid assembly of conducting elements 12 and the bracket 58 holds the header 20 in the position they will assume when in place between the layers of fabric of the blanket 10. The rollers 50 and 52 are mounted for rotation upon adjustable pairs of supports 60 and 62, and the hooks 48 are curved to permit either tight engagement, loose engagement and sagging, or disengagement of the conducting elements upon rotation of the rollers 50 and 52. The pairs of elements 60 and 62 are held in the desired spaced relationship by central bars 64 made adjustable by suitable slots 66 to accommodate variations in the sizes of the conducting element grid.

The complete jig assembly, with the conducting elements and the header 20 arranged thereon in a grid pattern, is placed on two parallel platforms 67, 67 over a tank 68 containing an activating solvent 69. The tubular rollers 50 and 52 are then rotated by means of end handles 70, to cause the conducting elements to sag in the middle and dip into the activating solution. To facilitate the immersion of the conducting elements 12, a platform 74 arranged above the jig 54 is lowered down over the central portion of the conducting elements to push them into the activating solvent.

Figure 5:
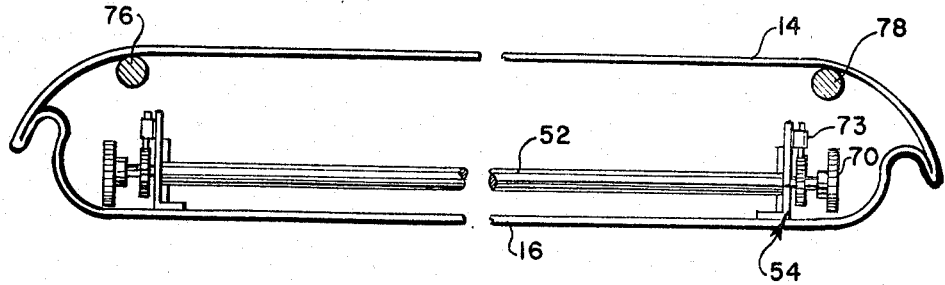
FIGURE 5 is a vertical sectional view of the blanket tube showing the conducting elements positioned therein on the jig prior to the withdrawal of the jig and prior to the sealing of the fabric materials to the conducting elements.

After the platform 74 is lifted off from the elements 12, the rollers 50 and 52 are rotated to tighten the conducting elements 12 in the grid pattern. A ratchet on the roller shaft 50 and a detent 73 on the element 60 prevent reverse rotation of the rollers 50 and 52 after the elements 12 have been tightened in the grid pattern. The complete jig assembly 54 is moved from the top of the tank 68 and placed between layers of a tube of blanket material (see FIGURE 5). Two guiding poles 76 and 78 are inserted in the blanket tube to keep it in an open position. Once again the rollers 50 and 52 are rotated to release the tension on the conducting elements 12 so that they will come to rest against the bottom layer of the blanket material, to which they become adhesively secured in the matter of a few minutes, with the blanket fibers embedded in the conducting element surfaces.

When the tubing is securely attached to the bottom fabric layer, the jig 54 is withdrawn from the conducting element grid. The jig is released by further rotation of the rollers 50 and 52 to cause the hooks 48 to become detached from the conducting elements. When the jig has been removed, the guiding poles 76 and 78 are withdrawn and the top of the blanket is permitted to fall into contact with the grid and become adhered thereto. The complete grid element will become fixed in position between the fabric layers in a matter of a few moments.

Thereafter the edges of the blanket are closed by suitable blanket edging fabric as at 18, FIGURE 1.

It has been found advantageous in accordance with the principles of this invention to provide a conducting element of one plastic material and a coating element of another material which can be solvent activated. In this way the solvent merely softens the outside material and leaves the walls of the inner conduit intact. In many instances the solvents such as methylethyl ketone, isobutyl ketone, acetones or the like are fast acting; that is, they activate the coating so that it becomes soft and tacky and immediately thereafter begins to set up. In such instances, it has been found desirable to cut the solvent solution by adding resins such as butadiene acrylonitrile with a phenolic or other similar combinations of compatible resins to the solution. By adding such resins it has been found that the evaporation of the solvent is reduced, the sag of the coating on the conducting elements is materially cut down, and the set up time is extended sufficiently so that the jig can be easily removed from the solvent tank and placed upon a blanket material in plenty of time for the elements to be secure thereto.

FIGURE 6 illustrates an alternative header construction, which provides another way of assembling the tubes to the header. In this embodiment, the passages 40 and 44 are beveled to taper outwardly toward each face of the block, terminating in openings of a diameter substantially larger than the outside diameter of the conducting elements 12. To assemble the conducting elements 12 to this header, each element is merely positioned in the beveled passage and activated. Alternatively, soft plastic 80 is poured around the tubes 12 to fill the space between the passage and the tube and seal the conducting elements in position upon hardening.

FIGURE 7 illustrates another header construction in which the elements 12 may be "potted" in each edge of the header 20. Each side of the header 20 is provided with an open rectangular section A formed by extensions of the top, bottom and side walls. The passages 40 and 44 are beveled to taper outwardly toward the outside faces of the block 20, and the elements 12 are wedged into place in their respective passages. Thereafter the elements are sealed to the block 20 by pouring a tacky or softened plastic into the section A around the elements 12 to seal them to the header in alignment with the passages upon hardening of the plastic.

In some instances it is preferable to activate the conducting elements after the grid is in position between the blanket layers. In this case, the grid may be arranged on the jig 54 and placed between the layers of fabric material. Thereafter, the tubular elements 12 are activated by solvent directed onto the elements through the fabric material of the blanket in the form of a spray. This may be done as shown in FIGURE 8 by arranging the complete jig and blanket assembly on a platform 81, with the jig bolted to the platform as at 82. A vertically movable tank 83 arranged on suitable guides 84 and having suitable openings 85 arranged at selected positions in vertical alignment with the conducting elements 12, is moved downwardly into contact with the top of the blanket 10. Solvent which will activate the material of the conducting element 12 is then forced under pressure from the tank 83 through the openings 85 and through the blanket fabric material onto the tubular elements 12 to activate the latter and cause them to become adhesively secured to the fabric material. The openings 85 may extend along the entire length of the conduits 12 or only at spaced locations. The solvent may be forced through the blanket in a liquid solution or blown therethrough in an air mixture admitted through an opening 88 in the tank 82.

Thus it is seen that the invention provides an extremely fast way for assembling thermal blankets and for positively positioning the conducting elements therein while still maintaining the desirable pliable feel in the completed blanket. It has been found that when the plastic materials described are used for the conducting elements and activated in the manner described herein, the conducting elements remain in their grid pattern position between layers of the fabric materials even after repeated washings and continuous handling of the blanket. When the grid is assembled in the manner of this invention and the tubes are adhered to the fabric as described the blanket will withstand much abuse and handling without deteriorating in any respect. It has been found that it is sufficient to adhere the conducting elements to the blanket at only selected strategic points and that when this is done a blanket having all the flexible and pliable characteristics of ordinary blankets is achieved.

While in accordance with the provisions of the statutes there is illustrated and described herein the best forms of the invention now known, those skilled in the art will understand that changes may be made in the form of apparatus disclosed without departing from the spirit of the invention covered by the claims.

What is claimed is:

1. A method of manufacturing an improved thermal blanket having a plurality of conducting elements therein arranged in a grid comprising the steps of dipping portions of said elements in a solution to soften the exterior surfaces of said elements, positioning said elements in a grid pattern, placing said grid between two spaced fabric layers, allowing the fabric layers to contact the softened exterior surfaces of said elements by their weight, embedding the fibers of the fabric layers in said softened exterior surfaces, and setting up said exterior surfaces for permanently bonding the grid pattern of conducting elements to both of said fabric layers for holding said conducting elements in position in the thermal blanket.

2. A method of manufacturing an improved thermal blanket having a plurality of conducting elements therein arranged in a grid comprising the steps of providing solvent softenable surfaces on said elements, positioning said elements in a grid between fabric layers, directing a solvent through said fabric layers to said conducting elements for softening the surfaces thereof, slightly pressing said fabric against the softened surfaces of said elements, and allowing the surfaces of said elements to set up with said fabric in contact therewith to cause the fibers of the fabric to become embedded and adhered therein.

3. A method of manufacturing an improved thermal blanket according to claim 2 wherein only preselected portions of said elements are contacted by said solvent.

4. A method of manufacturing an improved thermal blanket comprising the steps of assembling a plurality of hollow liquid-conducting tube elements in a grid pattern and bonding them to a header having tube-receiving passages therein, with the interiors of said liquid-conducting tubes in communication with passages in said header, dipping said elements in a solution to soften their outside surfaces, positioning said elements between two fabric layers, and allowing the fabric layers to contact the surface of said elements whereby the fibers of the fabric layers become embedded in the surfaces of said elements.

5. A method of manufacturing an improved thermal blanket according to claim 4 wherein said header is constructed with grooves formed in tube receiving passages therein, and said liquid-conducting tube elements are made larger than said passages, said method including the steps of dipping the ends of said elements in a solution to soften them, forcing the elements into said passages whereby portions of the tube outer surfaces are squeezed into said grooves, and allowing the elements to set up in said header to form a seal therewith.

6. A method of manufacturing an improved thermal blanket according to claim 4 wherein said header is constructed with an open rectangular section at each side thereof and a plurality of internal passages extending into communication with said open rectangular section, including wedging said elements into said passages and pouring a plastic in a tacky state into said section around said elements to secure the latter to said header with their interiors in communication with respective passages therein.

7. A method of manufacturing an improved thermal blanket having a plurality of small, flexible, interconnected liquid-conducting tubes arranged in a grid pattern for conducting liquid to control the blanket temperature comprising the steps of providing solvent-activatible surfaces on the liquid-conducting tubes, interconnecting said tubes to form a grid pattern, positioning said grid pattern between two layers of fabric material, blowing solvent through said layers of fabric material past the conducting tubes for activating said surfaces of the tubes, pressing said layers of fabric material against said grid pattern, and embedding the fibers of the fabric layers into the solvent-activated surfaces of the tubes, for bonding the tubes rapidly and neatly between the fabric layers, whereby said grid pattern remains in position in the thermal blanket even after repeated washings.

8. A method of manufacturing an improved thermal blanket having a plurality of small, flexible interconnected liquid-conducting tubes arranged in a grid pattern for conducting liquid to control the blanket temperature comprising the steps of coating a plurality of liquid-conducting tubes with solvent-activatible surfaces, interconnecting said tubes to form a grid pattern, positioning said grid pattern adjacent to a layer of fabric material, applying solvent to said activatible surfaces of the tubes for softening said surfaces of the tubes, and slightly pressing said fabric material and said grid pattern against each other for causing the fibers of the fabric layer to become embedded into the solvent-activated surfaces of the tubes for bonding said grid pattern of tubes rapidly and neatly to the fabric layer.

9. A method of manufacturing a liquid-conducting thermal blanket having all the flexible and pliable characteristics of ordinary blankets comprising the steps of coating a plurality of small diameter flexible tubes with a solvent-activatable coating, applying solvent to the ends of said tubes and inserting said ends into passages in a header for bonding the tubes thereto, forming said tubes in a grid pattern, positioning said grid between fabric layers and applying solvent to the tubes of said grid for softening said coating, slightly pressing the fabric layers against said softened coating, and embedding the fibers of said fabric layers in said softened coating for adhering the grid between said fabric layers for providing a flexible pliable thermal blanket wherein the grid pattern remains in position in the thermal blanket even after repeated washings.

References Cited by the Examiner
UNITED STATES PATENTS

| | | | |
|---|---|---|---|
| 1,896,953 | 2/1933 | Hassell | 62—185 |
| 2,110,022 | 3/1938 | Kliesrath | 165—46 |
| 2,250,325 | 7/1941 | Barnes | 165—46 |
| 2,372,485 | 3/1945 | Griffin | 29—525 X |
| 2,383,230 | 8/1945 | Voke | 156—308 |
| 2,397,743 | 4/1946 | Kaphan | 161—122 |
| 2,495,636 | 1/1950 | Hoeltzel et al. | 156—308 |
| 2,501,690 | 3/1950 | Prendergast | 264—173 |
| 2,548,467 | 4/1951 | Crise | 219—46 |
| 2,559,077 | 7/1951 | Johnson et al. | 219—46 |
| 2,753,435 | 7/1956 | Jepson | 257—12 X |
| 2,964,437 | 12/1960 | Appleton et al. | 156—293 |

EARL M. BERGERT, *Primary Examiner.*

HAROLD ANSHER, ALEXANDER WYMAN,
*Examiners.*

A. H. FRITSCHLER, *Assistant Examiner.*